US008347810B2

(12) United States Patent
Saine et al.

(10) Patent No.: US 8,347,810 B2
(45) Date of Patent: Jan. 8, 2013

(54) PROTECTIVE MEMBER AND NOZZLE ASSEMBLY CONFIGURED TO RESIST WEAR

(75) Inventors: Joel E. Saine, Dahlonega, GA (US); Paul Schmidt, Sugarhill, GA (US)

(73) Assignee: Nordson Corporation, Westlake, OH (US)

( * ) Notice: Subject to any disclaimer, the term of this patent is extended or adjusted under 35 U.S.C. 154(b) by 599 days.

(21) Appl. No.: 12/529,619

(22) PCT Filed: Apr. 3, 2008

(86) PCT No.: PCT/US2008/059261

§ 371 (c)(1),
(2), (4) Date: Sep. 2, 2009

(87) PCT Pub. No.: WO2008/124498

PCT Pub. Date: Oct. 16, 2008

(65) Prior Publication Data

US 2010/0024987 A1 Feb. 4, 2010

Related U.S. Application Data

(60) Provisional application No. 60/909,817, filed on Apr. 3, 2007.

(51) Int. Cl.

| | |
|---|---|
| ***B05B 1/28*** | (2006.01) |
| ***B05B 13/02*** | (2006.01) |
| ***B05B 13/04*** | (2006.01) |
| ***B05B 7/06*** | (2006.01) |
| ***G05G 15/00*** | (2006.01) |
| ***B65C 9/40*** | (2006.01) |
| ***B05C 1/00*** | (2006.01) |
| ***B05C 5/00*** | (2006.01) |
| *B05D 1/02* | (2006.01) |
| *B05D 3/12* | (2006.01) |
| *B05D 3/04* | (2006.01) |
| *B05D 5/00* | (2006.01) |
| *B32B 41/00* | (2006.01) |
| *B32B 37/00* | (2006.01) |
| *B29C 65/00* | (2006.01) |
| *B29C 47/00* | (2006.01) |

(52) U.S. Cl. ........ 118/325; 118/234; 118/305; 118/307; 118/313; 118/320; 427/256; 427/286; 427/288; 427/348; 427/422; 156/244.11; 156/359; 156/578; 239/290; 239/296

(58) Field of Classification Search .................. 118/325, 118/305, 307, 234, 420, 313, 320; 427/424, 427/348, 422, 256, 286, 288; 156/578, 359, 156/244.11; 239/296, 290
See application file for complete search history.

(56) References Cited

U.S. PATENT DOCUMENTS 6,197,406 B1 3/2001 Kwok (Continued)

FOREIGN PATENT DOCUMENTS

CN 1246390 A 3/2000

OTHER PUBLICATIONS

Paolo Francesco Manicone, Pierfrancesco Rossi Iommetti, Luca Raffaelli, An overview of zirconia ceramics: Basic properties and clinical applications, Journal of Dentistry, vol. 35, Issue 11, Nov. 2007, pp. 819-826, ISSN 0300-5712, 10.1016/j.jdent.2007.07.008. (http://www.sciencedirect.com/science/article/pii/S0300571207001418.*

(Continued)

*Primary Examiner* — Dah-Wei Yuan
*Assistant Examiner* — Binu Thomas
(74) *Attorney, Agent, or Firm* — Wood, Herron & Evans, LLP

(57) ABSTRACT

A protective member (14) and a nozzle assembly (11) incorporating the protective member (14) are provided. The protective member (14) is for use with a nozzle (12) having a strand guide passageway (18) for receiving a strand (16) of material. Protective member (14) comprises a body (60) configured to be received in the strand guide passageway (18) of the nozzle (12). The body (60) of the protective member (14) has a passageway (63) for the strand (16) and is disposed between the strand guide passageway (18) and the moving strand (16). The body (60) of the protective member (14) is composed, at least in part, of a material having a wear resistance sufficient to resist wear caused by the strand (16) being guided thereby. Alternatively, a portion of the body (60) may be coated with a material having a wear resistance sufficient to resist wear caused by the strand (16).

9 Claims, 7 Drawing Sheets

U.S. PATENT DOCUMENTS

| | | | | |
|---|---|---|---|---|
| 6,200,635 | B1 | 3/2001 | Kwok | |
| 6,308,388 | B1 * | 10/2001 | Haider | 28/271 |
| 6,461,430 | B1 | 10/2002 | Kwok | |
| 6,676,038 | B2 | 1/2004 | Gressett, Jr. et al. | |
| 6,911,232 | B2 | 6/2005 | Crane et al. | |
| 2002/0134859 | A1 | 9/2002 | Gressett et al. | |
| 2003/0189114 | A1 * | 10/2003 | Taylor et al. | 239/602 |
| 2004/0144494 | A1 | 7/2004 | Harris et al. | |
| 2004/0164180 | A1 * | 8/2004 | Harris et al. | 239/296 |
| 2005/0205689 | A1 | 9/2005 | Crane et al. | |

OTHER PUBLICATIONS

International Searching Authority, Notification of Transmittal of the International Search Report and the Written Opinion of the International Searching Authority dated Aug. 7, 2008 in corresponding international application No. PCT/US08/59261.

Chinese Patent Office, Office Action in corresponding Chinese Application No. 200880010654.5 issued Jul. 5, 2011.

Chinese Patent Office, Office Action in corresponding Chinese Application No. 200880010654.5 issued May 14, 2012.

* cited by examiner

PROTECTIVE MEMBER AND NOZZLE ASSEMBLY CONFIGURED TO RESIST WEAR

CROSS-REFERENCE TO RELATED APPLICATIONS

This application claims the benefit of U.S. Provisional Application No. 60/909,817, filed Apr. 3, 2007, which is hereby incorporated by reference herein in its entirety.

TECHNICAL FIELD

The present invention relates generally to liquid dispensing systems, and more specifically, to nozzle assemblies for a liquid dispensing apparatus configured to dispense a liquid filament on a strand of material.

BACKGROUND

Many reasons exist for dispensing liquid adhesives, such as hot melt adhesives, in the form of a thin filament with a controlled pattern. One technology capable of dispensing controlled patterns of thin filaments is known as controlled fiberization (for example, CF® technology from Nordson Corporation). CF® technology is especially useful for accurately covering a wider region of a substrate with adhesive dispensed as single filaments or as multiple side-by-side filaments from nozzle passages having small diameters, such as on the order of 0.010 inch to 0.060 inch.

CF® technology is often used to improve control over adhesive placement. This may be especially useful along the edges of a substrate and on very narrow substrates, for example, such as on strands of material (e.g., LYCRA® by INVISTA) used in the leg bands of diapers.

Conventional swirl nozzles or die tips typically have a central adhesive discharge passage surrounded by a plurality of air passages. The adhesive discharge passage is centrally located on a protrusion that is symmetrical in a full circle or radially about the adhesive discharge passage. A common configuration for the protrusion is conical or frustoconical with the adhesive discharge passage exiting at the apex. The air passages are arranged in a radially symmetric pattern about the central adhesive discharge passage. The air passages are directed in a generally tangential manner relative to the adhesive discharge passage and are all angled in a clockwise or counterclockwise direction around the central adhesive discharge passage.

Conventional meltblown adhesive dispensing apparatus typically comprise a nozzle body having multiple adhesive or liquid discharge passages disposed along an apex of a wedge-shaped member and air passages of any shape disposed along the base of the wedge-shaped member. The wedge-shaped member is not a radially symmetric element. Rather, it is typically elongated in length relative to width. The air is directed from the air discharge passages generally along the side surfaces of the wedge-shaped member toward the apex, and the air impacts the adhesive or other liquid material as it discharges from the liquid discharge passages to draw down and attenuate the filaments. The filaments are discharged in a generally random manner.

Various types of nozzle bodies, such as those of the type described above, have been used to dispense adhesive filaments onto one or more elastic strands. Each strand is typically aligned and directed by a strand passage proximate the corresponding adhesive discharge passage. The strands tend to acquire airborne particulates present in the environment surrounding the liquid adhesive dispensing apparatus. These airborne particulates consist of dust and other contaminants that primarily originate from the processing operations performed by the production line. In addition, the strands, particularly those available from Fulflex, Inc. may be intentionally coated with particulates, such as talc, to facilitate release when extracted from their packaging. In addition, other strand manufactures may add pigments to the strand material to color the strand. Typically, the coloration pigments are abrasive to the nozzle body and, consequently, wear rate on the nozzle may be appreciably higher with colorized strand materials.

Furthermore, as each strand interacts with the corresponding strand passage, the particulates, regardless of origin, may be wiped off and accumulate or agglomerate into larger masses. The agglomerated masses of particulates may dislodge from the strand passage and incorporate into the dispensed adhesive filament. For example, the agglomerated mass may be dislodged by a knot that is formed between the trailing end of a first length of strand material and the leading edge of a second length of strand material joined to provide a continuous strand. Alternatively, the agglomerated mass may remain resident in the guide and increase in dimensions to such an extent that the strand itself is displaced or removed from the guide. In multi-strand dispensing operations, an adjacent guide may capture the displaced strand, which disrupts the application of adhesive to the strands and ultimately produces defective product because the strands are adhesively bonded to a substrate with improper positioning. The reduction in product quality may be significant and may increase the manufacturing cost.

Yet another difficulty associated with dispensing adhesive onto a guided, moving strand arises from contact between the strand and the strand passage. Specifically, the strand wears the metal surfaces of the nozzle body and the metal surfaces of the strand passages due to frictional wear. Eventually, the wear may necessitate replacement of the nozzle body.

What is needed, therefore, is a nozzle body for dispensing a liquid filament onto a substrate in which the difficulties associated with strand guiding are reduced or eliminated.

SUMMARY OF THE INVENTION

In one embodiment, a protective member is provided for use with a nozzle. The nozzle has a strand guide passageway and a liquid discharge port. The strand guide passageway is adapted for receiving a strand of material that is in motion relative to the nozzle. The liquid discharge port is adapted for dispensing a filament of liquid on the strand after the strand passes through the strand guide passageway. The protective member comprises a body configured to be received in the strand guide passageway of the nozzle. The body has a passageway for receiving the strand and for preventing the strand from contacting the strand guide passageway. The body is constructed, at least in part, from a material having a wear resistance sufficient to resist wear caused by the strand being guided thereby.

In another embodiment, the body is composed of a metal selected from a stainless steel, a tool steel, a high speed steel, or combinations thereof. In yet another embodiment, the body is composed of a ceramic material. In still another embodiment, the body is composed of a first material, the body includes a tubular sidewall extending about the passageway and has an inner surface confronting the strand, and further comprises a coating of a second material on the inner surface. The second material has a greater wear resistance to contact by the strand than the first material of the body.

In another embodiment, a nozzle assembly is provided for dispensing a filament of liquid onto a strand of material that is in motion relative to the nozzle assembly. The nozzle assembly comprises a nozzle and a protective member. The nozzle has a strand guide passageway for receiving the strand of material that is in motion relative to the nozzle. The nozzle has a liquid discharge port for dispensing the liquid filament onto the strand of material after the strand passes through the strand guide passageway. The protective member has a body that is configured to be received in said strand guide passageway. The body has a passageway for receiving the strand and for preventing the strand from contacting the strand guide passageway. The nozzle is composed of a first material and said protective member is composed, at least in part, of a second material having a greater wear resistance than the first material.

DETAILED DESCRIPTION

For the purposes of this description, words of direction such as “upward”, “vertical”, “horizontal”, “right”, “left”, “front”, “rear”, “side”, “top”, “bottom”, and the like are applied in conjunction with the drawings for purposes of clarity and providing a reference frame in the present description only. As is well known, liquid dispensing devices may be oriented in substantially any orientation, so these directional words should not be used to imply any particular absolute directions for an apparatus consistent with the invention.

Figure 4:
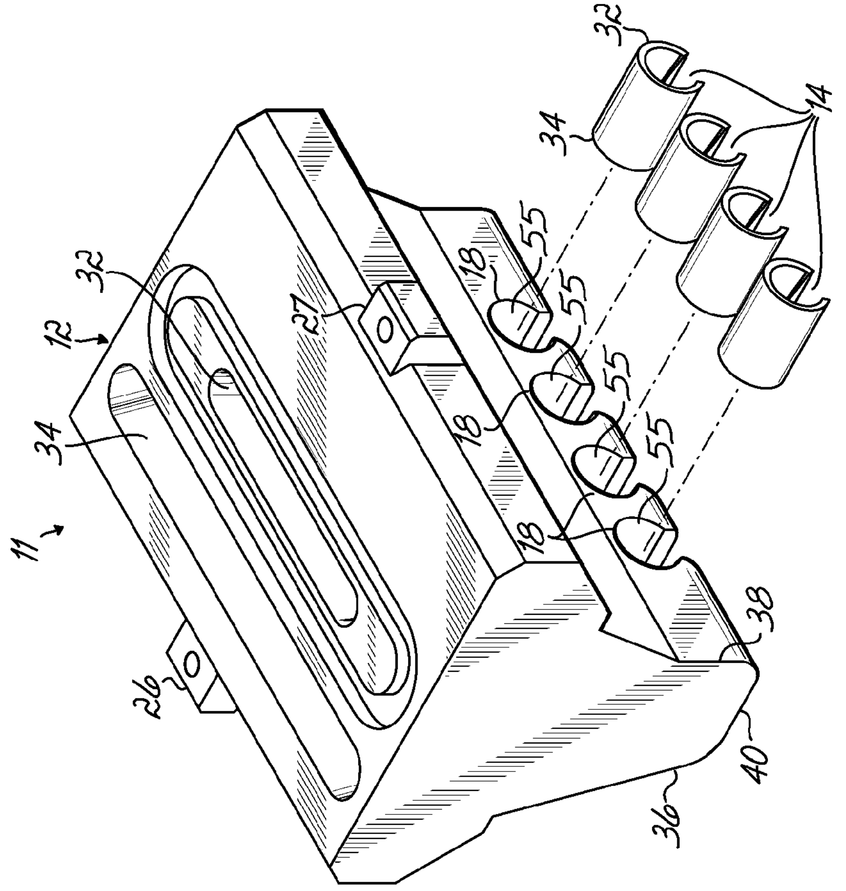
FIG. 4 is an exploded view similar to FIG. 3 in which the protective members are removed from the nozzle body of the nozzle assembly.
Figure 3:
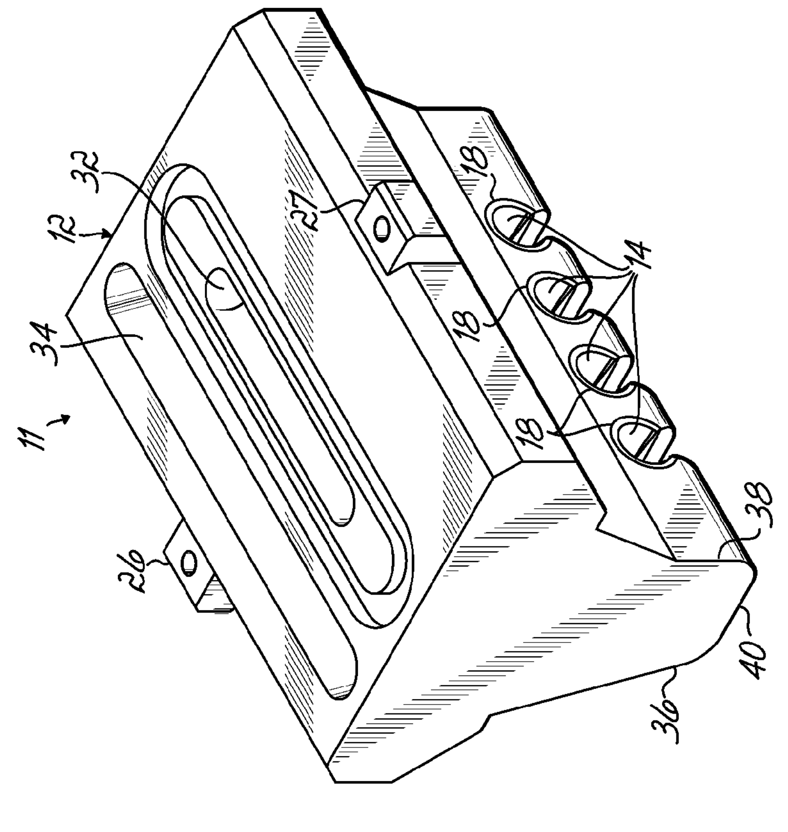
FIG. 3 is a front perspective view of the nozzle assembly of FIGS. 1, 1A, 1B, and 1C.

Referring to FIGS. 1, 1A, 2, 3, and 4, a representative dispensing module 10 is coupled with a nozzle assembly 11, which includes a nozzle 12 and a plurality of protective members 14 constructed in accordance with an embodiment of the invention. The dispensing module 10 is configured to dispense liquid filaments 15 from the nozzle assembly 11 onto strands 16 of material, which are fed and move in a machine direction (as indicated by the single-headed arrows 25 in FIGS. 1 and 1A) relative to the stationary nozzle assembly 11. Examples of suitable nozzles 12 and liquid dispensing apparatuses include those disclosed in U.S. Pat. No. 6,911,232 and U.S. Patent Application Publication Nos. 2004/0144494 and 2004/0164180, the disclosures of which are fully incorporated herein by reference. In one exemplary embodiment, the nozzle 12 further includes a plurality of strand guide passageways 18 with an equal number of protective members 14 cooperatively positioned with respect to each of the strand guide passageways 18, as best shown in FIGS. 3 and 4. It will be appreciated that, in an alternative embodiment, the nozzle 12 may only include a single strand guide passageway 18 and, therefore, a single protective member 14.

The protective members 14 function as sleeves or liners that are received in the strand guide passageways 18. As a result of this arrangement, the strands 16 fed in a machine direction 25 contact the protective members 14 rather than the nozzle 12 during dispensing. Thus, the material selected for the nozzle 12 may be optimized without having to take wear caused by contact with the strands 16 within the strand guide passageway 18 into consideration, as will be described in more detail below.

The dispensing module 10 generally has a central body portion (not shown), a lower body portion 22, and a quick disconnect mechanism 24 for facilitating the installation and removal of various nozzles or dies from the dispensing module 10, as more fully described in U.S. Pat. No. 6,619,566, filed on Mar. 22, 2001, and assigned to the assignee of the present application. The nozzle assembly 11 is coupled to the dispensing module 10 and secured with the quick disconnect mechanism 24. Nozzle assembly 11 receives liquid and pressurized air from the dispensing module 10 and dispenses a filament 15 of liquid material in a controlled pattern onto a strand 16 of substrate material moving relative to the nozzle assembly 11, generally in the direction of arrow 25, while directing pressured air toward the filament 15.

Figure 1:
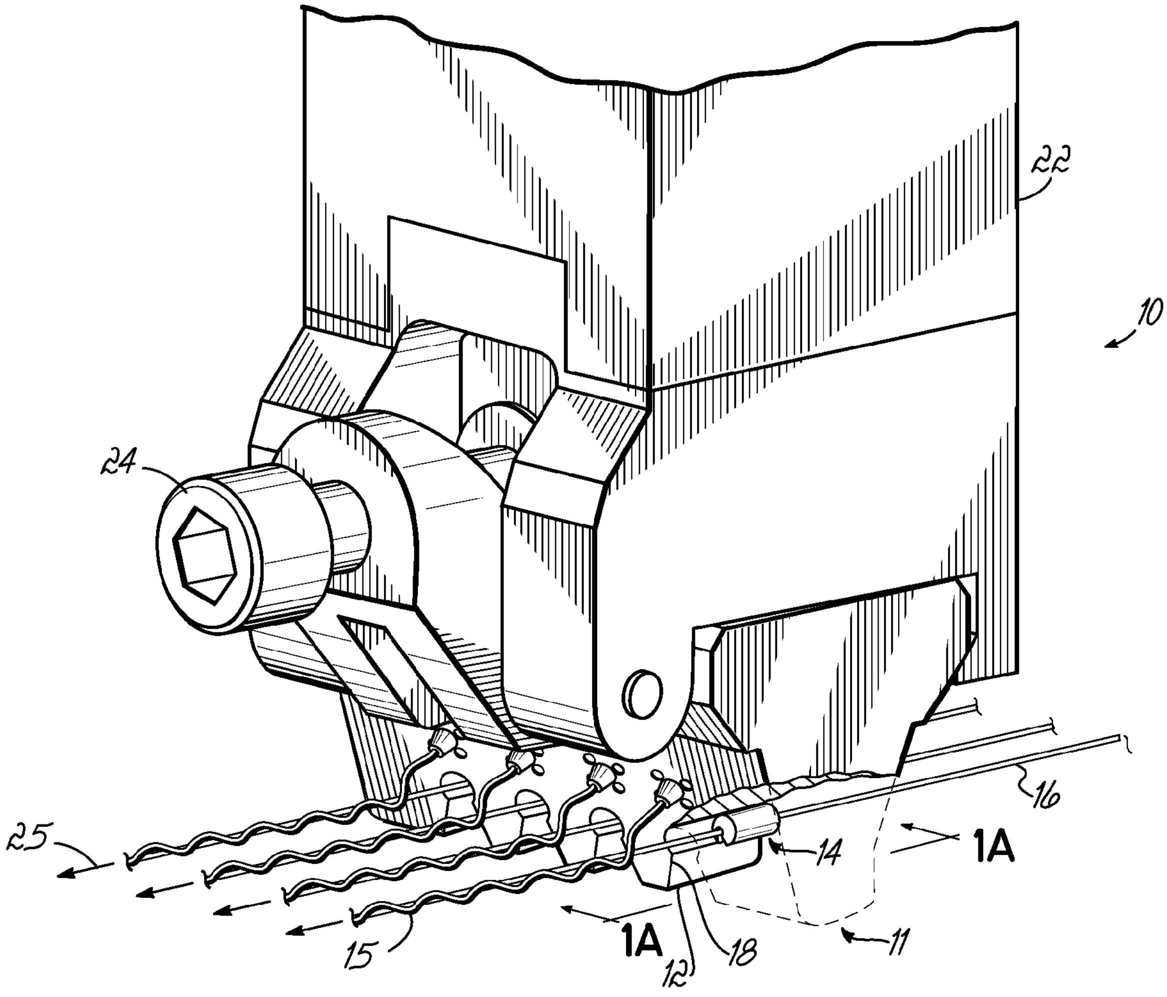
FIG. 1 is a partially broken away perspective view of an exemplary dispensing module and nozzle assembly in accordance with an embodiment of the invention.

The nozzle 12 of the nozzle assembly 11 includes protrusions 26, 27 and angled cam surfaces 28, 29, as more fully described in U.S. Pat. No. 6,619,566, to facilitate coupling the nozzle assembly 11 with the dispensing module 10. The nozzle 12 includes a first side 30 configured to mount to the lower body portion 22 of the dispensing module 10 (FIG. 1). The first side 30 of the nozzle 12 includes a liquid supply port 32 and a process air supply port 34 which mates to corresponding liquid and air supply passages (not shown) in the dispensing module 10. The nozzle 12 has a generally wedge-shaped cross-section including second and third (i.e., downstream and upstream) sides 36, 38. A frustoconically-shaped protrusion 40 extends from the second side 36 of the nozzle 12 to the third side 38.

Figure 1A:
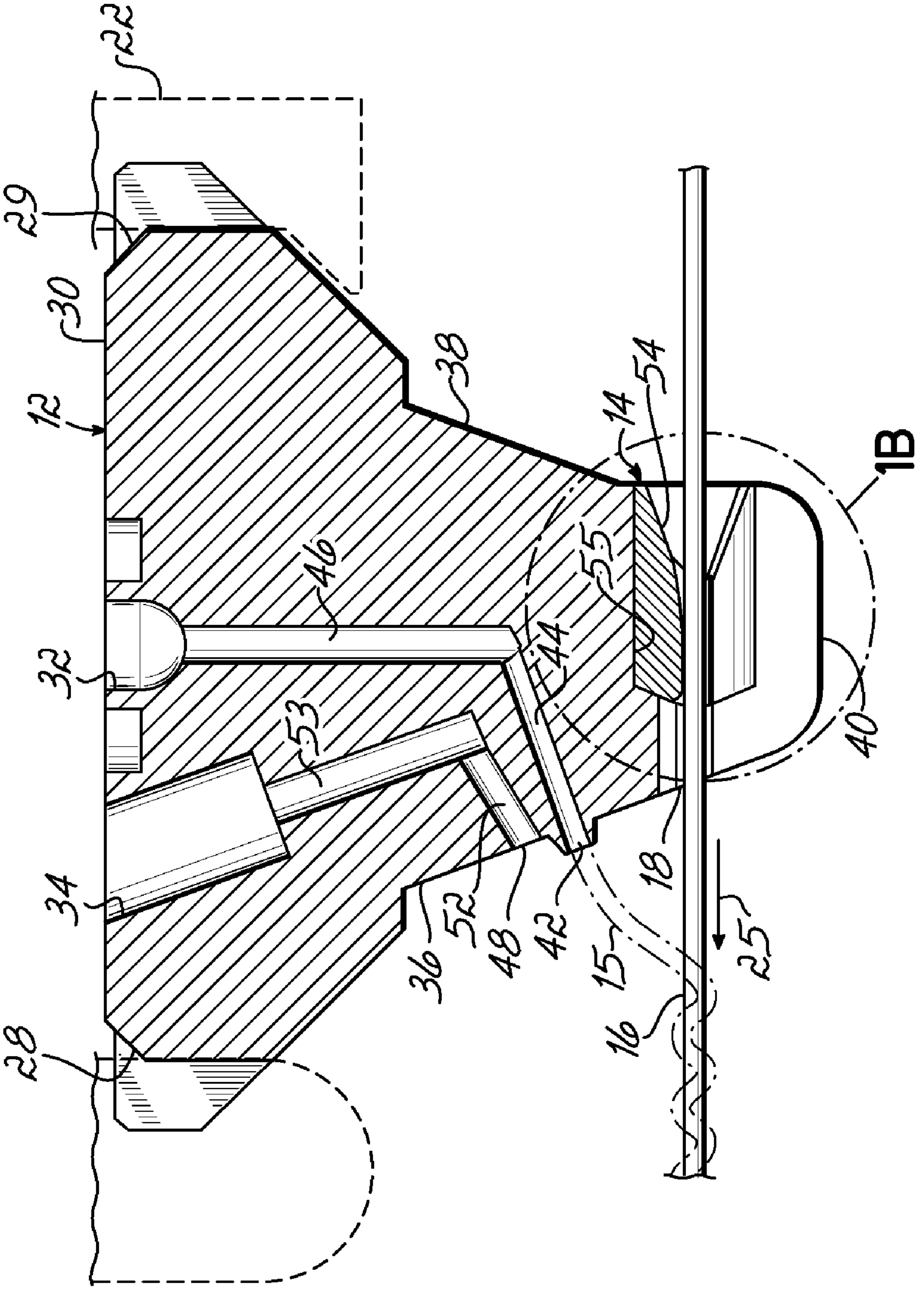
FIG. 1A is a cross-sectional view of the nozzle assembly taken generally along line 1A-1A in FIG. 1.

A liquid discharge port 42 is in fluid communication with a liquid discharge passage 44, which in turn is in communication with the liquid supply port 32 by way of a liquid passage 46, whereby liquid material from the module 10 may be dispensed from the liquid discharge port 42 to the strand 16 of substrate material depicted in FIG. 1A. At least a portion of the liquid discharge passage 44 is oriented to form an angle with a direction corresponding to movement of the strand 16, generally indicated by arrow 25. The liquid discharge passage 44 of the exemplary embodiment is inclined, whereby the liquid material is dispensed from the liquid discharge port 42 onto the strand 16 and generally in the direction of strand movement 25.

The second side 36 of the nozzle 12 further includes a plurality of air discharge outlets 48 proximate the liquid discharge port 42. The air discharge outlets 48 are in fluid communication with air discharge passages 52 (FIG. 1A) by way of respective air passages 53, which extend to the air supply port 34 on the first side 30 of the nozzle 12. The air discharge passage 52 of the exemplary nozzle 12 may be inclined from an axis through liquid discharge passage 44. The air discharge outlets 48 are configured to direct process air toward the liquid filament 15 dispensed from the liquid discharge passage 44. The nozzle 12 includes multiple strand guide passageways 18, extending from the second side 36 to the third side 38, which may, for example, be notches formed in the frustoconically-shaped protrusion 40.

Multiple strand guide passageways 18 are formed in the frustoconically-shaped protrusion 40, extending from the second side 36 to the third side 38. As best shown in FIGS. 3 and 4, protective members 14 are disposed in respective bores 55 defined in the nozzle 12 and within the strand guide passageways 18 and intersecting the upstream side 38 of the protrusion 40. However, the nozzle 12 may be designed such that the bores 55 for the protective members 14 intersect the downstream side 36. Alternatively, the bores 55 may extend from between the sides 36, 38 through the full thickness of the protrusion 40 so that the protective members 14 may be inserted from either of the sides 36, 38 and removed from either of the sides 36, 38. Although the protective members 14 are depicted as having an identical physical construction, the bores 55 of the nozzle 12 may be designed to cooperate with protective members 14 of various different physical constructions. Additionally, it is not necessary that all of the protective members 14 used with the nozzle 12 have an identical physical construction or that all of the protective members 14 are composed of the same material or combination of materials.

Figure 1C:
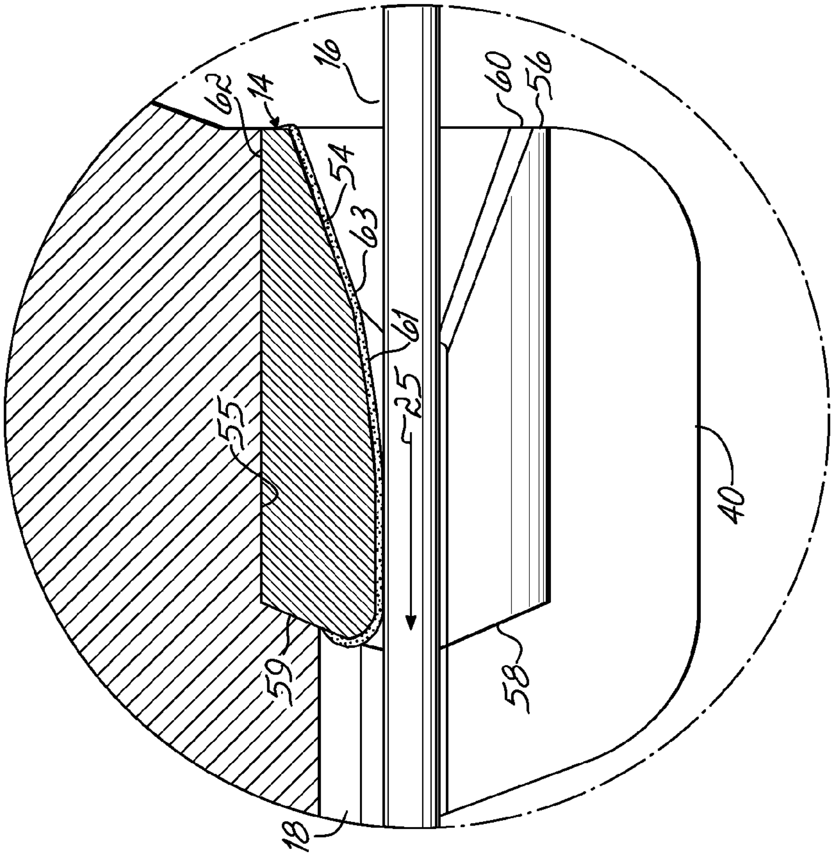
FIG. 1C is an enlarged view of enclosed area 1B in FIG. 1A illustrating a coating on the protective member.
Figure 1B:
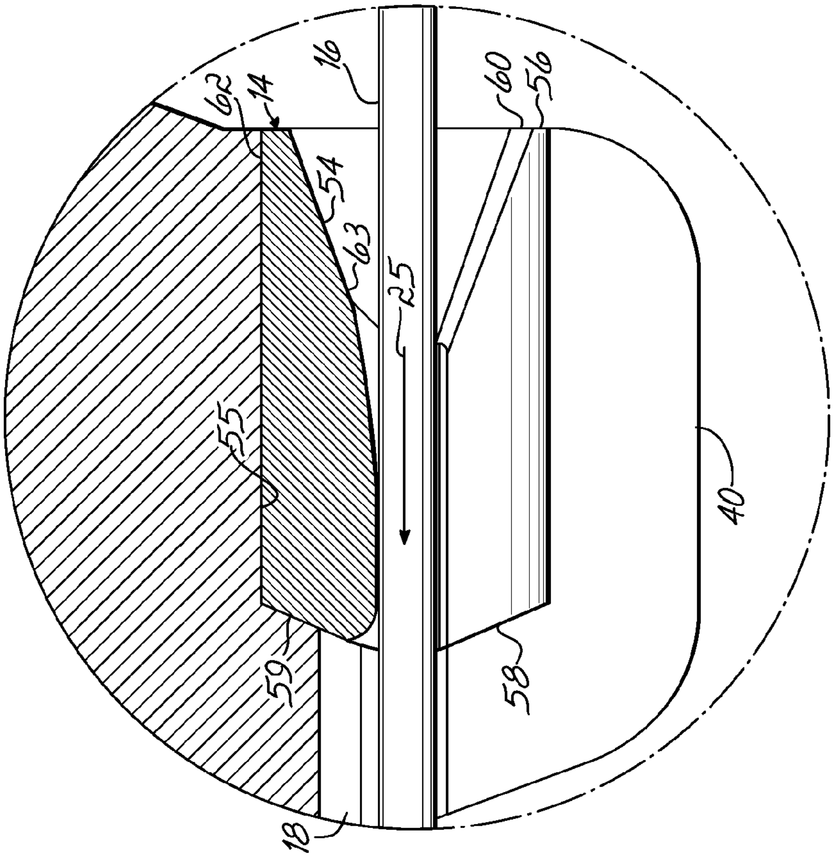
FIG. 1B is an enlarged view of enclosed area 1B in FIG. 1A.
Figure 2:
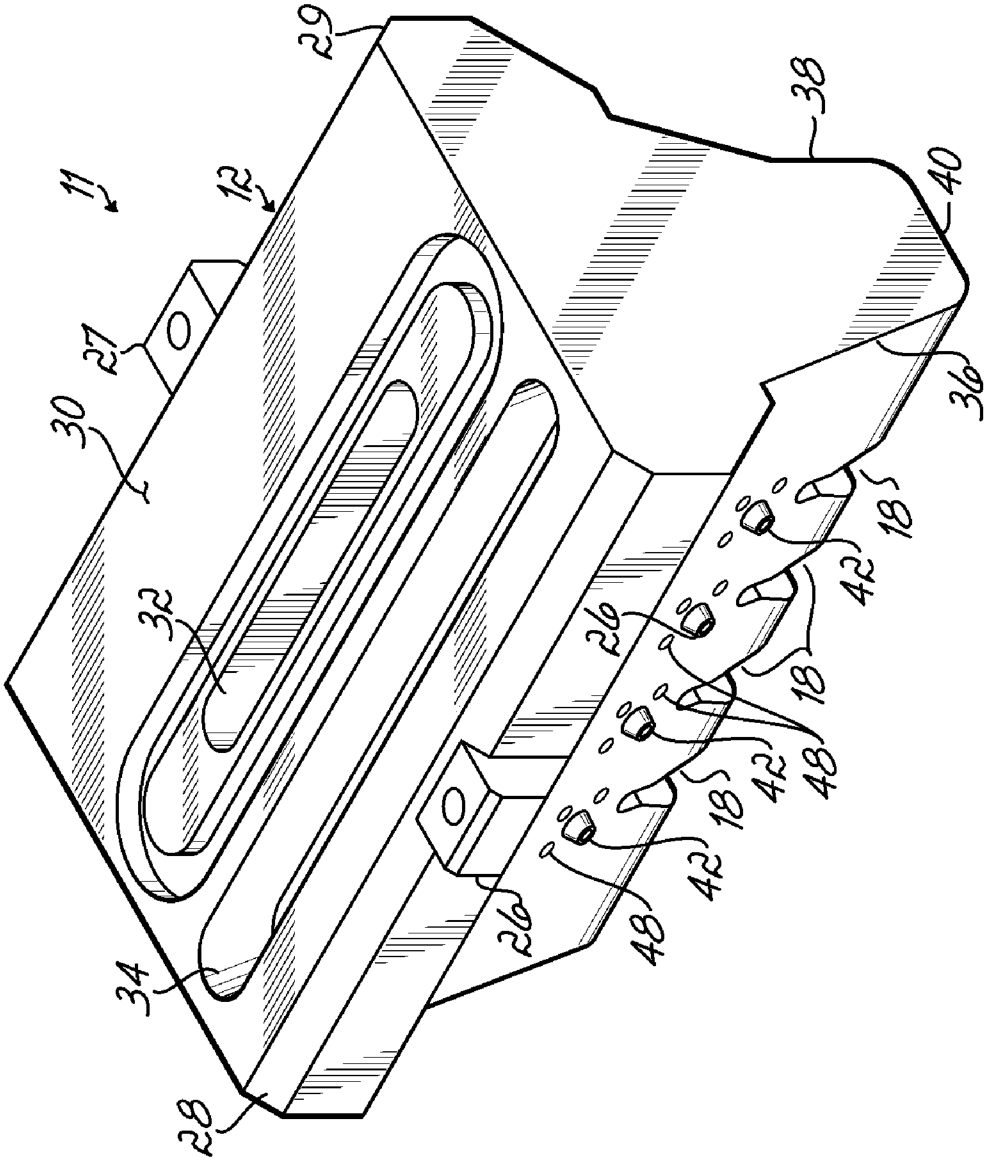
FIG. 2 is a rear perspective view of the nozzle assembly of FIGS. 1, 1A, 1B, and 1C.

As apparent from FIGS. 1, 1A, and 1B, each of the strands 16 is guided through one of the strand guide passageways 18. To increase the service life or longevity of the nozzle 12, one of the protective members 14 may be provided in a respective strand guide passageway 18. By way of example only, the protective members 14 may be press fit, glued, bolted, screwed, or otherwise fastened to, in, or within, the bores 55 in the strand guide passageways 18 of the nozzle 12 such that the moving strands 16 constantly or intermittently contact the protective members 14 rather than the nozzle 12.

As best shown in FIGS. 1A and 1B, each strand 16 may contact one of the protective members 14 and, more specifically, may contact an inner surface 54 of one of the protective members 14, rather than the nozzle 12 as shown. In particular, as each strand 16 moves through the respective protective member 14, any location along the length of the strand 16 passes from a first or leading end 56 of the protective member 14 to a second or trailing end 58 of the protective member 14. As a result of this arrangement, the material selected for the nozzle 12 may be optimized without having to take into consideration wear caused by the frictional contact of the strands 16 on the protective member 14. The protective members 14 may be constructed from a material selected according to or contingent upon, among other factors, a desired rate of wear or the particular material properties of the strand 16. In one embodiment, the material of the protective member 14 has a greater resistance to wear than the material of the nozzle 12. While the material of the protective member 14 may be harder and/or tougher than the material of the nozzle 12, the protective member 14 may additionally or alternatively be more chemically, erosion, or corrosion resistant to contact with the strand 16 for other reasons, notwithstanding improved hardness and/or toughness of the protective member material. For example, the construction of the protective member 14 may take into account strand materials containing pigments for coloration or for other purposes, which may be abrasive, corrosive, or otherwise able to degrade the nozzle 12. Thus, the nozzle 12 may be formed from a first material that may be economical from a material cost and machinability perspective, while the protective members 14 may formed from a second material having a greater ability to resist degradation caused by contact with the strands 16 within the strand guide passageways 18 and guided by the protective members 14.

While embodiments of the invention are generally illustrated and described herein with the nozzle 12 as an integral one-piece structural component configured with a liquid discharge port 42, one or more air discharge outlets 48, strand guide passageways 18, and protective members 14 provided in the strand guide passageways 18, the invention is not limited to these representative embodiments. For example, other embodiments may include nozzles configured with one or more strand guide passageways in one component and another component configured with a liquid discharge port and/or air discharge outlets. In other words, one or more strand guide passageways may not be an integral part of the same component that contains the liquid discharge ports and/or air discharge outlets, but may instead be contained in a non-integral component that is attached to another component containing the liquid discharge outlet and/or air discharge outlets. Thus, in these embodiments, the component with the strand guide passageway may be removed from the nozzle without removing other components configured with liquid discharge ports and/or air discharge outlets.

In one specific embodiment, the nozzle 12 may be constructed from brass and the protective members 14 may be constructed from stainless steel. In other specific embodiments, the protective members 14 may be constructed, at least in part, from metals that exhibit high wear resistance, including but not limited to CPM metals (e.g., 9V, 10V, and 12V) available from Crucible Specialty Metals, Syracuse, N.Y., as well as those high speed or tool steels that exhibit extreme wear resistance. In one embodiment, the protective members 14 may be constructed, at least in part, from a material exhibiting a hardness of 9 or greater on the Mohs scale. The Mohs scale is one generally excepted scale for rating the relative hardness of various materials. In particular, the Mohs scale provides information on the capability of one material to scratch another. The Mohs scale rates materials from 1, being the softest, to 10, being the hardest. By way of example, talc is rated 1 on the Mohs scale, while alumina is generally rated as a 9 on the Mohs scale. In other embodiments, the protective members 14 may exhibit a hardness of less than 9 on the Mohs scale while extending the life of the nozzle 12 in proportion to, for example, the life of a protective member made of a material rated as a 9 on the Mohs scale. In yet additional embodiments, a wide variety of other materials may be used for the protective members 14, including, but not limited to, wear resistant oxide ceramic materials, like alumina and zirconia, or nitride ceramic materials.

Figure 7:
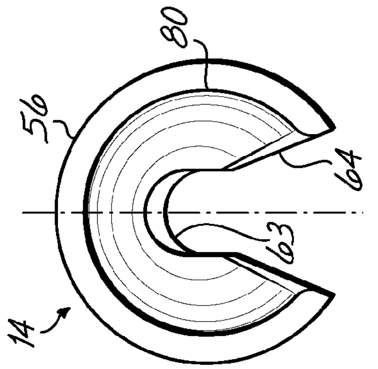
FIG. 7 is a front view of the protective member of FIG. 5.
Figure 7A:
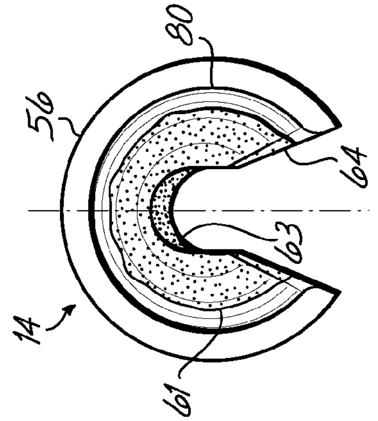
FIG. 7A is a front view of the protective member of FIG. 5 illustrating a coating on an inner surface thereof.
Figure 6:
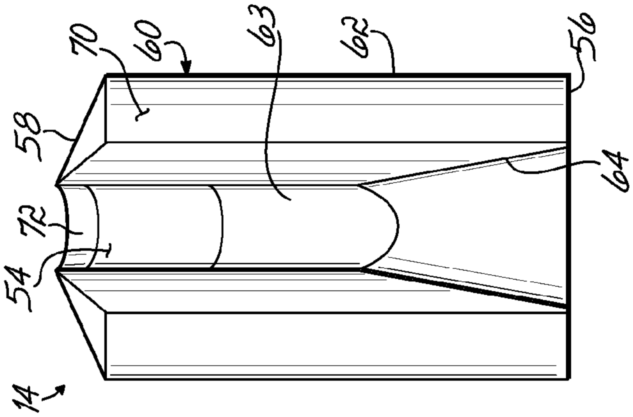
FIG. 6 is a bottom view of the protective member of FIG. 5.

In an alternative embodiment and with reference to FIGS. 1C and 7A, to further improve the ability of the protective members 14 to resist degradation, each protective member 14 may be coated with a material designed for this purpose. A coating 61 may be disposed on those areas of the protective member 14 that contact the strand 16. In particular, the coating 61 may be placed on the entire passageway 63, or only a portion thereof, as shown in FIG. 7A. For example, each of the protective members 14 may comprise a base metal, such as stainless steel, with the coating 61 composed of a wear-resistant material, such as titanium nitride, having a suitable thickness as appreciated by a person having ordinary skill in the art to be effective to impart degradation resistance. In one embodiment, the layer of titanium nitride may be approximately 0.0001 inches (approximately 2.54 μm) to approximately 0.0005 inches (approximately 12.7 μm) thick. Other thicknesses may include those that are approximately 0.0003 inches (approximately 7.62 μm) thick. It will be appreciated, however, that the thickness of the coating 61 may be selected according to the desired rate of wear or determined by the method used to apply the coating 61. An exemplary technique that may be used to deposit the coating is physical vapor deposition (PVD), such as, but not limited to sputtering, ion plating, ion-beam-assisted deposition, filtered cathodic-arc vacuum technology, and ion implantation. Other known deposition techniques or coating processes that may be equally applicable include, for example, chemical vapor deposition (CVD), like plasma-enhanced CVD; electroplating, for example, hard chromium plating; nonelectrolytic deposition processes, like electroless plating; dipping coating; anodizing; and any of a variety of thermal spray processes, like atmospheric plasma, high velocity oxygen fuel (HVOF), or flame spray type processes. Other suitable coating materials may include, but are not limited to, titanium aluminum nitride, titanium carbonitride, and zirconium nitride. In another embodiment, the coating 61 may be made, at least in part, of a material, for example, rated as a 9 or greater on the Mohs scale.

Figure 5:
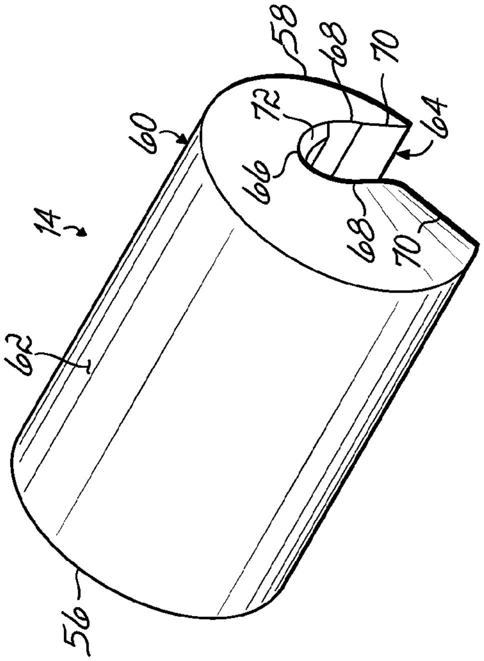
FIG. 5 is an enlarged perspective view of one of the protective members of FIG. 4.
Figure 9:
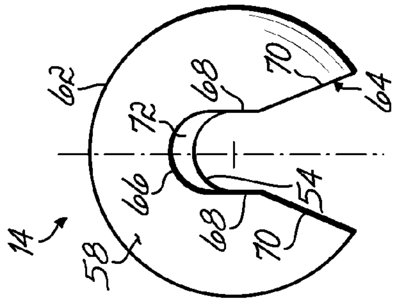
FIG. 9 is a rear view of the protective member of FIG. 5.

With reference now to FIGS. 1A, 1B, and 5-9 and in accordance with an embodiment of the invention, one of the protective members 14 is shown in greater detail and has a representative physical construction. The protective member 14 includes a body 60 having a tubular sidewall 62 extending between the leading end 56 and the trailing end 58. In one embodiment, the tubular sidewall 62 forms a passageway 63 through the body 60 such that the inner surface 54 at least partially surrounds the strand 16 while it is within the protective member 14. The body 60 is generally arranged in the respective bore 55 between the strand guide passageway 18 and the strand 16. The body 60 has a generally cylindrical cross section but includes a slot 64 extending through the tubular sidewall 62, which includes the inner surface 54 (visible in FIG. 6), as previously described, configured to confront a strand between the leading end 56 and the trailing end 58. As best shown in FIGS. 5 and 9, at the trailing end 58, which may be dome-shaped, the slot 64 is defined by a semicircular or arcuate top section 66, a substantially rectangular intermediate section 68, and a flared lower section 70 so as to resemble a flared keyhole. The dome-shaped surface of the trailing end 58 is shaped to conform to a concave surface 59 within the corresponding strand guide passageway 18. For example, the dome-shaped trailing end 58 (shown in FIG. 5) may be designed to take the form of the end of a drill bit, thus facilitating a near replica of the concave surface 59 that may be machined with a similarly-shaped drill bit. This construction may assure some degree of intimate contact between protective member 14 and nozzle 12. By way of example, the protective member 14 may have an overall length of about 0.215 inches and a diameter of about 0.110 inches though the protective member 14 is not limited to these sizes and may be scaled to facilitate, for example, guiding strands of various diameters.

Figure 10:
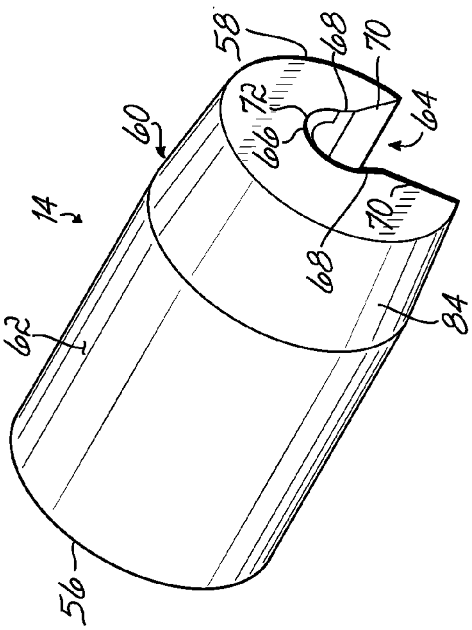
FIG. 10 is an enlarge perspective view of another embodiment of the protective member of FIG. 4.

Another embodiment of the protective member 14 is illustrated in FIG. 10. This exemplary protective member 14 has a tapered surface 84 that intersects a flat trailing end 58 rather than a dome-shaped trailing end 58 described above. This embodiment may also facilitate installation and positioning of the protective member 14 within the nozzle 12. Like the protective member 14 depicted in FIG. 5, the exemplary protective member 14 illustrated in FIG. 10 may be designed having the shape of a tool used to form the bore 55 in the nozzle 12.

With reference to FIGS. 1A, 1B, the bore 55 housing the protective member 14 partially extends through the corresponding strand guide passageway 18. It will be appreciated, however, that bore 55 housing the protective member 14 may alternatively extend completely through the corresponding strand guide passageway 18. The shape of each strand guide passageway 18 generally conforms to the shape of the tubular sidewall 62 and cooperates therewith so that the protective members 14 are self-aligned when inserted into the strand guide passageways 18.

Referring now to FIGS. 5-9, the flared lower section 70 is generally maintained for a distance as the slot 64 extends toward the leading end 56, although a lip 72 in the top section 66 may provide a transition as the slot 64 extends from the trailing end 58. Additionally, as visible in FIG. 8, the top section 66 may extend along a path 74 generally parallel to a central axis 76 of the body 60 before extending along a path 78 slightly angled or curved relative to the central axis 76. In this embodiment, the tubular sidewall 62 increases in cross-sectional area along the central axis 76 toward the trailing end 58. In one particular embodiment, the path 78 flares at the leading end 56 and as such appears as a “flared keyhole” configuration, as best shown in FIG. 7.

Figure 8:
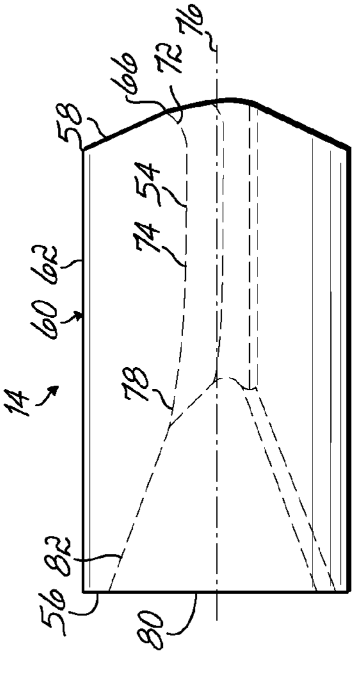
FIG. 8 is a side view of the protective member of FIG. 5.

As best shown in FIGS. 7 and 8, after extending partially through the body 60 with the “flared keyhole” configuration, the slot 64 flares outwardly in a radial direction so that it ultimately assumes a generally circular cross-sectional configuration and defines an enlarged opening 80 at the leading end 56. Thus, the slot 64 is defined by a cone-shaped transition section 82 as it approaches the leading end 56. As each strand 16 moves through the protective member 14 as shown in FIGS. 1, 1A, and 1B, the strand 16 is centered within the protective member 14 by the inner surface 54 along path 74 and, possibly, path 78, such that the strand 16 is positioned directly below liquid discharge port 42 (FIG. 1A). The flared keyhole configuration allows airborne contaminants or particulates on the strand, like talc, to pass through the protective member 14 without creating build up which might lead to strand breakage.

The protective member 14 may be machined or molded to have the shape shown in the figures, depending on the type of material used to make the protective member 14. By way of example only, and not limitation, the protective member 14 may be machined if constructed from a metal, such as stainless steel or another metal, previously mentioned. Alternatively, the protective member 14 may be formed by molding a ceramic powder as known in the art if constructed from a ceramic material, such as alumina. The protective members 14 may be inserted into the bores 55 defined in the nozzle 12 and within the strand guide passageways 18 or, alternatively, the nozzle 12 and protective members 14 may be assembled in a different manner to form the nozzle assembly 11.

While the invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of the general inventive concept.

What is claimed is:

1. A nozzle assembly for dispensing a filament of liquid onto a strand of material that is in motion relative to the nozzle assembly, the nozzle assembly comprising:

a nozzle having a strand guide passageway for receiving a strand of material that is in motion relative to said nozzle, and a liquid discharge port for dispensing the liquid filament onto the strand of material after the strand passes through said strand guide passageway, a protective member having a body configured to be received in said strand guide passageway, said body having a tubular sidewall forming a passageway for receiving the strand and for preventing the strand from contacting the strand guide passageway, and a slot comprising a portion of the passageway, said slot including an arcuate top section, an intermediate section, and a flared lower section, wherein said nozzle is composed of a first material, and said protective member is composed at least in part of a second material having a greater wear resistance than said first material.

2. The nozzle assembly of claim 1 wherein said nozzle includes a plurality of said strand guide passageways, and a plurality of said protective members, each of said protective members positioned in a respective one of said plurality of strand guide passageways.

3. The nozzle assembly of claim 1 wherein said first material is a brass and said second material is a metal selected from a stainless steel, a tool steel, a high speed steel or combinations thereof.

4. The nozzle assembly of claim 1 wherein said second material is a ceramic material.

5. The nozzle assembly of claim 1 wherein said protective member extends partially through said strand guide passageway.

6. The nozzle assembly of claim 1 wherein said tubular sidewall has an inner surface confronting the strand, and further comprising:

a coating of a third material on said inner surface of said tubular sidewall, said third material having a greater wear resistance to contact by the moving strand than said second material of said protective member.

7. The nozzle assembly of claim 1 wherein said body includes a leading end at which the strand enters the a passageway and a trailing end at which the strand exits the passageway, and said slot is proximate to the trailing end of the body.

8. The nozzle assembly of claim 1 wherein said intermediate section is substantially rectangular.

9. The nozzle assembly of claim 4 wherein said ceramic material is selected from an alumina, a zirconia, or a combination thereof.

* * * * *